US011345468B2

(12) United States Patent
Ramoth et al.

(10) Patent No.: US 11,345,468 B2
(45) Date of Patent: May 31, 2022

(54) CLEVIS ASSEMBLY WITH BEARING DEVICE IN OPERABLE COMMUNICATION WITH A TRANSLATING ELEMENT, AND FAIL-SAFE TAIL ROTOR SYSTEM INCLUDING THE SAME

(71) Applicant: LOCKHEED MARTIN CORPORATION, Bethesda, MD (US)

(72) Inventors: Roger H. Ramoth, Naugatuck, CT (US); Scott J. Young, Milford, CT (US); Travis L. Yates, Lakeside, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 211 days.

(21) Appl. No.: 16/726,849

(22) Filed: Dec. 25, 2019

(65) Prior Publication Data
US 2021/0197963 A1 Jul. 1, 2021

(51) Int. Cl.
*B64C 27/82* (2006.01)
*B64C 27/12* (2006.01)
*B64C 27/32* (2006.01)
*B64C 27/78* (2006.01)
*F16D 1/108* (2006.01)

(52) U.S. Cl.
CPC ............. *B64C 27/82* (2013.01); *B64C 27/12* (2013.01); *B64C 27/32* (2013.01); *B64C 27/78* (2013.01); *B64C 2027/8209* (2013.01); *B64C 2027/8254* (2013.01); *B64C 2201/024* (2013.01); *F16D 1/108* (2013.01)

(58) Field of Classification Search
CPC ......... B64C 27/12; B64C 27/32; B64C 27/78; B64C 27/82; B64C 2027/8209; B64C 2027/8254; B64C 2201/024; F16D 1/108
USPC ...................................... 244/17.21
See application file for complete search history.

(56) References Cited

U.S. PATENT DOCUMENTS

| 3,759,631 | A | * | 9/1973 | Rybicki | .................. B64C 27/35 416/134 R |
| 3,944,023 | A | | 3/1976 | Fisher | |
| 4,269,384 | A | * | 5/1981 | Saeed | ...................... E01D 19/00 248/548 |
| 5,415,525 | A | * | 5/1995 | Desjardins | .............. B64C 27/45 416/164 |
| 5,466,082 | A | | 11/1995 | Sherar | |
| 9,359,073 | B2 | | 6/2016 | Hewitt | |
| 9,441,495 | B2 | | 9/2016 | Schmaling et al. | |
| 2009/0194638 | A1 | * | 8/2009 | Dennis | .................. B64C 23/069 244/131 |

(Continued)

OTHER PUBLICATIONS

Extended Search Report issued from the European Patent Office for related Application No. 20214405.1 dated May 11, 2021 (8 Pages).

*Primary Examiner* — Brady W Frazier
(74) *Attorney, Agent, or Firm* — Michael Best & Friedrich LLP

(57) ABSTRACT

According to an aspect, a clevis assembly includes a shackle having two ends, each end respectively including an aperture, a structure connecting the apertures and housing a bearing, and a shearing device that includes a frangible point and is in operable communication with the bearing, where the shearing device is housed in a hollow portion of the structure.

20 Claims, 4 Drawing Sheets

(56) References Cited

U.S. PATENT DOCUMENTS

| | | | |
|---|---|---|---|
| 2013/0121828 A1* | 5/2013 | Davis | B64C 27/32 |
| | | | 416/134 A |
| 2015/0034760 A1* | 2/2015 | Hewitt | F16C 41/001 |
| | | | 244/17.21 |
| 2017/0267339 A1 | 9/2017 | Bergeson et al. | |
| 2019/0009897 A1 | 1/2019 | Baskin et al. | |
| 2019/0276144 A1 | 9/2019 | Mullen et al. | |

* cited by examiner

CLEVIS ASSEMBLY WITH BEARING DEVICE IN OPERABLE COMMUNICATION WITH A TRANSLATING ELEMENT, AND FAIL-SAFE TAIL ROTOR SYSTEM INCLUDING THE SAME

BACKGROUND

Exemplary embodiments relate to the art of rotary wing aircraft, and more particularly, to a fail-safe for a tail rotor system.

In a typical rotary wing aircraft, such as a helicopter for example, a tail rotor system converts tail driveshaft rotary power into the aerodynamic forces necessary to control the direction of flight and to counteract main rotor torque. However, component failures can cause additional torque to be introduced into the helicopter's mechanical system. The added torque can damage system components at unpredictable points in the system.

BRIEF DESCRIPTION

According to one embodiment, a clevis assembly includes a shackle having two ends, each end respectively including an aperture, a structure connecting the apertures and housing a bearing, and a shearing device that includes a frangible point and is in operable communication with the bearing, where the shearing device is housed in a hollow portion of the structure.

In addition to one or more of the features described above or below, or as an alternative, the clevis assembly further includes a piston in operable communication with the shearing device and restrained from spinning, where shearing devices is operable to shear under a pressure greater than a threshold amount and allow the piston to spin.

In addition to one or more of the features described above or below, or as an alternative, a proximal end of the shearing device extends outward from an aperture of an end of the two shackle ends and a distal end of the shearing device is arranged within an aperture of an outer raceway of the bearing.

In addition to one or more of the features described above or below, or as an alternative, the clevis assembly further includes a threaded insert arranged between an inner surface of the structure and an outer surface of the shearing device.

In addition to one or more of the features described above or below, or as an alternative, an inner raceway of the bearing is in operable communication with a piston.

In addition to one or more of the features described above or below, or as an alternative, the piston comprises a plurality of splines such that coupling the piston with the bearing creates a spline joint.

In addition to one or more of the features described above or below, or as an alternative, the shearing device is a cylindrical rod, and wherein the frangible point is a portion of the cylindrical rod having a diameter smaller than another portion of the cylindrical rod.

In addition to one or more of the features described above or below, or as an alternative, the frangible point is a portion of the shearing device comprised of a material having a lesser tensile strength than another portion of the shearing device.

In addition to one or more of the features described above or below, or as an alternative, the frangible point is a hollow portion of the otherwise solid shearing device.

In addition to one or more of the features described above or below, or as an alternative, the frangible point is a portion of the shearing device having divots along a surface of the portion.

In addition to one or more of the features described above or below, or as an alternative, the shearing device is attached to the clevis by a fastener.

In addition to one or more of the features described above or below, or as an alternative, the bearing is a journal bearing.

According to another embodiment, a rotary wing aircraft inlcudes a plurality of blade assemblies, and a tail rotor system having a clevis assembly, where the clevis assembly inlcudes a shackle having two ends, each end respectively comprising an aperture, a structure connecting the apertures and housing a bearing, and a shearing device comprising a frangible point and in operable communication with the bearing, wherein the shearing device is housed in a hollow portion of the structure.

In addition to one or more of the features described above or below, or as an alternative, the rotary wing aircraft further includes a piston in operable communication with the shearing device and restrained from spinning, where the shearing device is operable to shear under a pressure greater than a threshold amount and allow the piston to spin with a tail rotor of the rotary wing aircraft.

In addition to one or more of the features described above or below, or as an alternative, an inner raceway of the bearing is in operable communication with a piston.

In addition to one or more of the features described above or below, or as an alternative, the piston is in operable communication with a pitch change shaft of the tail rotor system.

In addition to one or more of the features described above or below, or as an alternative, the frangible point is configured to break upon application of a pressure greater than a threshold amount.

In addition to one or more of the features described above or below, or as an alternative, the pressure is received by the frangible point from an outer raceway of the bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

Figure 1:
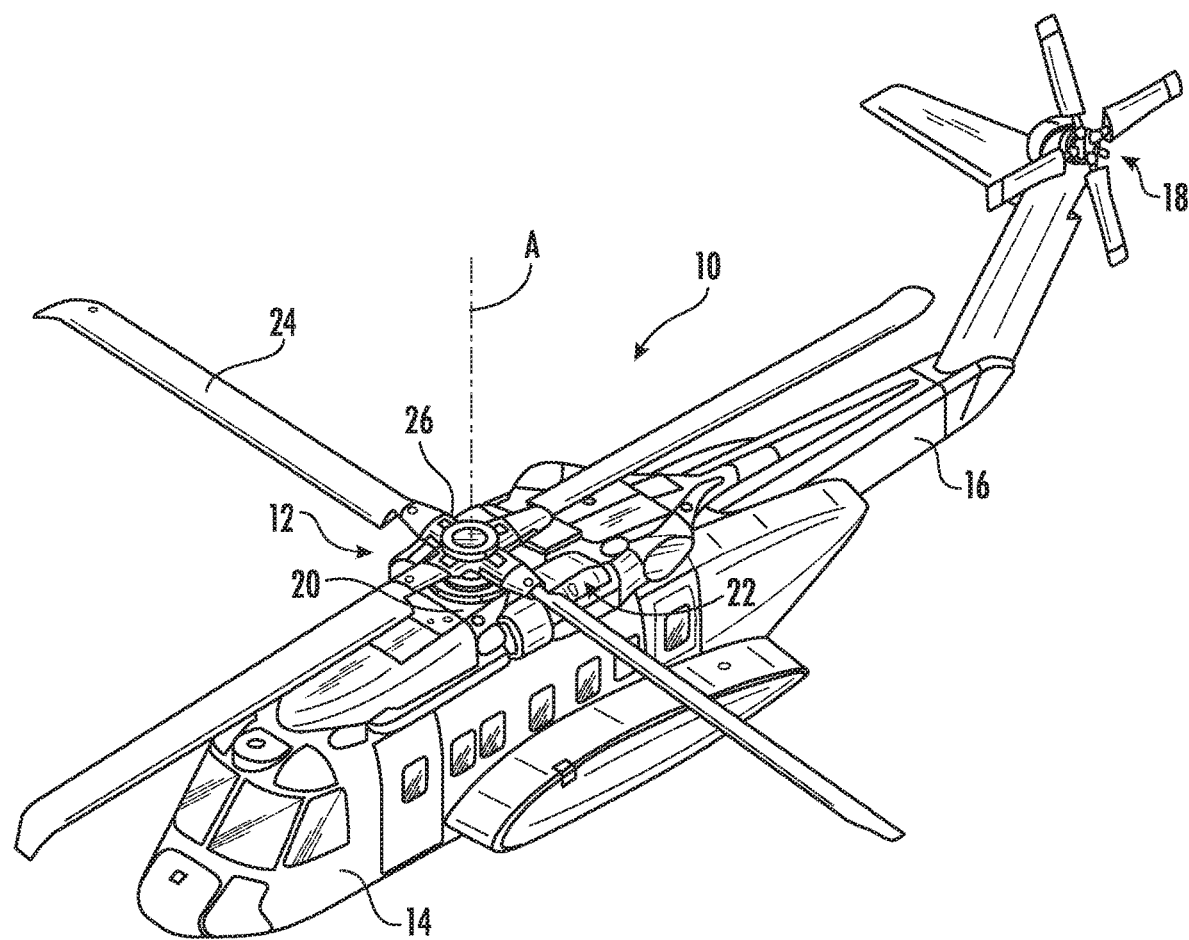
FIG. 1 depicts a rotary wing aircraft in accordance with an exemplary embodiment.

With reference now to FIG. 1, an example of a vertical takeoff and landing (VTOL) aircraft is schematically illustrated. The aircraft 10 in the disclosed, non-limiting embodiment includes a main rotor assembly 12 supported by an airframe 14 having an extending tail 16 which mounts an anti-torque system/tail rotor (TR) system 18. The main rotor assembly 12 is driven about an axis of rotation A through a main rotor gearbox (MGB) 20 by one or more engines 22. The engines 22 generate the power available for flight operations and couple such power to the main rotor assembly 12 and the TR system 18 through the MGB 20. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines or any application with a critical bearing of the configuration described herein will also benefit here from.

Figure 2:
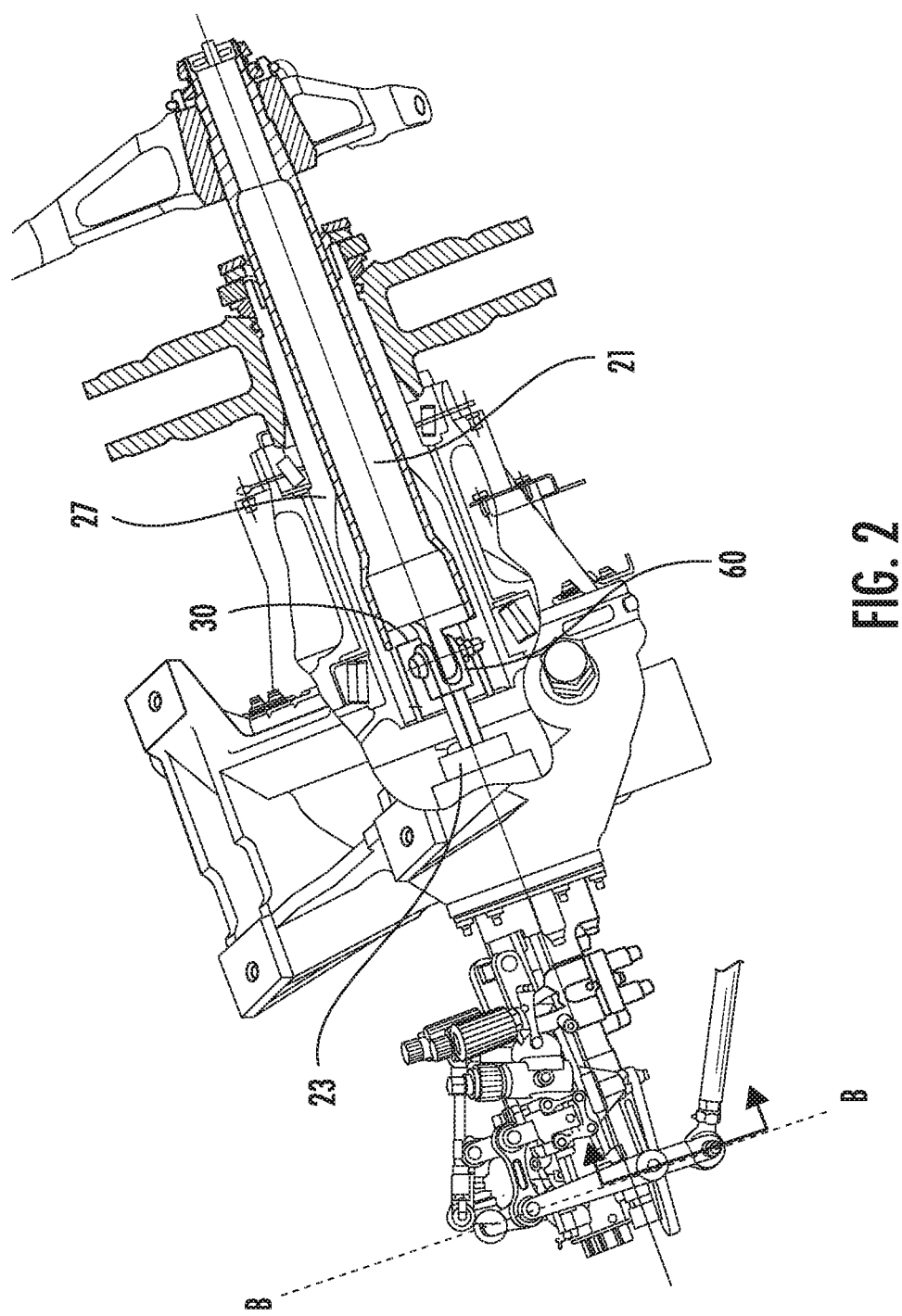
FIG. 2 depicts a schematic side view of an aircraft tail rotor system in accordance with an exemplary embodiment.
Figure 3:
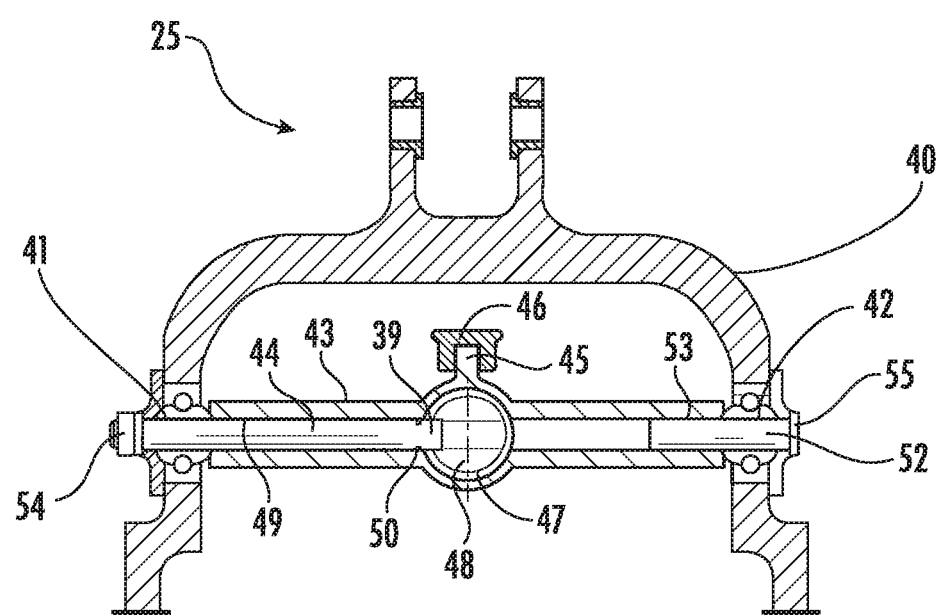
FIG. 3 depicts a cross-sectional view of a frangible point shearing device arranged in a clevis of an aircraft tail rotor system in accordance with an exemplary embodiment.
Figure 4:
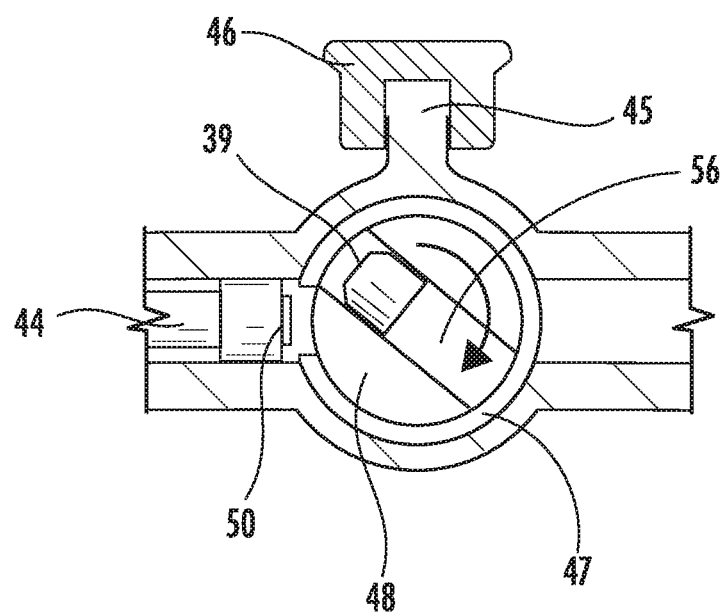
FIG. 4 depicts a blown-up illustration of a clevis assembly with a sheared frangible point in accordance with an exemplary embodiment.

With reference to FIGS. 2, 3, and 4, an aircraft TR system 18 that converts tail driveshaft rotary power into aerodynamic forces necessary to control the direction of flight of the aircraft 10 and to counteract the main rotor torque. FIGS. 3 and 4 are a cross-sectional view of the clevis assembly across line BB of FIG. 2 FIG. 3 illustrates the clevis assembly 25 prior to any shearing of a mechanical fuse 39. FIG. 4 illustrates the clevis assembly 25 with a sheared mechanical fuse 39. The TR system 18 provides a mounting point for tail rotor blades (TRBs) and for a blade pitch change mechanism. The pitch of the TRBs is controlled by the position of the tail rotor pitch change shaft (PCS) 21. The positioning of the PCS 21 is controlled by a pitch change servo (hereinafter referred to as a "translating element 23"). When the translating element 23 pulls the PCS 21 inboard, a pitch walking beam (not shown) and pitch change control links (not shown) associated with each of the TRBs twist the TRBs about internal elastomeric bearings (not shown) to increase blade pitch. Conversely, when the translating element 23 permits the PCS 21 to move outboard, the pitch walking beam and pitch change control links associated with each of the TRBs twist the TRBs about the internal elastomeric bearings to decrease blade pitch. An increase in blade pitch will turn the aircraft 10 to the left and a decrease in pitch will turn the aircraft 10 to the right.

The PCS 21 rotates with and moves linearly within a rotating tail rotor shaft (hereinafter referred to as a "rotating element 27"). A PCS bearing structure 30 supports the PCS 21 within the rotating element 27 and allows the PCS 21 and the rotating element 27 to rotate independently of the non-rotating translating element 23. As will be described below, an outer raceway of the PCS bearing structure 30 rotates with the PCS 21 and the rotating element 27, while an inner raceway is non-rotating and coupled to the translating element 23 by way of a translating element's clevis 60 and thereby moves linearly with the translating element 23.

The translating element 23 is connected to a tail rotor of the TR system 18 through a PCS bearing structure 30 that allows the tail rotor to spin while the translating element 23 translates only and does not spin. The translating element 23 has an anti-rotation tab 45 and an anti-rotation plate 46 to react to normal drag loads from the PCS bearing structure 30. The anti-rotation tab 45 and the anti-rotation plate 46 (collectively known as the "anti-rotation feature") hinder binding in the translating element's mechanical input controls, which are connected to the translating element 23 output (not shown).

One or more embodiments of the present invention include a fail-safe feature (shearing device 44) that disconnects only the translating element 23 output from the anti-rotation feature while maintaining the connection to the mechanical input controls. Under certain conditions, high torque levels are transmitted by the TR system 18 leading to the shearing of components in the translating element 23. For example, a failure of the tail rotor pitch shaft bearing can cause an increase in the torque transmitted by the TR system 18.

In the event of the PCS bearing structure 30 seizing, high torque is transmitted to the translating element 23 thereby leading to the failure of the piston 48 is restrained from rotation. In the present invention, the shearing device 44 shears under high torque and allows the piston 48 to spin with the tail rotor drive as opposed to reacting to the tail rotor torque as in a conventional system. This protects the structural integrity of the translating element 23 and allows for continued although limited operation with a temporarily spinning translating element 23 output. According to one or more embodiments of the present invention, the shearing device 44 includes, but is not limited to a resettable mechanical fuse, a one-time shear device, pin, a cotter pin, a breakaway tab, shear tab, or some other mechanism that allows the translating element 23 output to spin.

In one or more embodiments of the present invention, a mechanical fuse 39 is introduced to prevent damage to the translating element 23 caused by the additional torque, and allow a control input to continue to the PCS 21. The mechanical fuse 39 allows a piston 48 to spin along with the tail rotor under high torque conditions while preventing damage to input/feedback linkages thereby permitting control for a limited time, for example to effectuate a safe landing.

With reference to FIG. 3, the mechanical fuse 39 is incorporated with the clevis assembly 25, which includes a shackle portion 40 with two ends. Each end includes at least one respective aperture 41, 42 for receiving at least one shearing device 44. It should be appreciated that although the shearing device 44 depicted in FIGS. 3 and 4 is a pin, the shearing device 44 includes other structures operable to shear due to high torque transmitted by the TR system 18. For illustration purposes, in FIGS. 3 and 4 the shearing device 44 is a pin, however, it should be appreciated that the shearing device 44 includes other structures operable to shear in response to a high-torque transmitted by the TR system 18. The apertures 41, 42 are connected by a structure 43 having a hollow portion and extending from a first aperture 41 at an end of the clevis assembly 25 to a second aperture 42 at the other end of the clevis assembly 25. In some embodiments, the structure 43 is cylindrical. The structure 43 includes an anti-rotation tab 45 and an anti-rotation plate 46 for countering torque generated by the main rotor. The structure 43 houses a bearing 47 with an inner raceway in operable communication with a TR system piston 48. For example, the bearing 47 includes a journal bearing, an oil-impregnated bushing, or other bearing-type structure. The piston 48 includes splines, such that when inserted into the bearing 47 a spline joint is created. The TR system piston 48 is in operable communication with the PCS 21. In some embodiments, the bearing 47 is housed in a central part of the structure 43 and substantially equidistant from the ends of the clevis assembly 25. The outer raceway of the bearing 47 includes an opening for receiving the at least one shearing device 44.

The at least one shearing device 44 is received by the aperture 41 of the clevis assembly 25 and the hollow portion of the structure 43. A proximal end of the pin is arranged at the aperture 41 of the clevis assembly 25. A portion of the at least one shearing device 44 extends beyond an outer surface of the clevis assembly 25 and is fastened to the clevis assembly 25 by a fastener 54. A threaded insert 49 is arranged between the structure 43 and the at least one shearing device 44. The threaded insert 49 further secures the at least one shearing device 44 to the structure 43. A distal end of the shearing device 44 includes a mechanical fuse 39. The mechanical fuse 39 has a frangible point 50, such that when the outer raceway of the bearing 47 applies a force greater than a threshold amount (high torque), the at least one shearing device 44 breaks through a shear force at the frangible point 50. In some embodiments, the at least one shearing device 44 is a cylindrical rod and the frangible point 50 is a portion of the rod having a diameter less than the diameter of the other portion of the rod. In other embodiments, the frangible point 50 is comprised of a material having a tensile strength less than a tensile strength of the other portion of the at least one shearing device 44. In yet other embodiments, the frangible point 50 includes pre-made divots on an outer surface of the at least one shearing device 44. In yet even other embodiments, the frangible point 50 is hollow, whereas the other portion of the at least one shearing device 44 is solid.

FIG. 4 is provided to illustrate the shearing of the mechanical fuse 39. The inner raceway of the bearing 47 is in operable communication with a piston 48 via splines. The piston 48 is in operable communication with the PCS 21. Under typical conditions, the piston 48 does not rotate. However, if the PCS bearing structure malfunctions, the resulting torque causes the piston 48 to rotate, which in turn causes the bearing 47 to rotate. The force applied by the outer raceway of the bearing 47 causes the at least one shearing device 44 to shear at the frangible point 50. As seen in FIG. 4, the shearing device 44 has sheared at the frangible point 50, and the mechanical fuse 39 has dislodged from the shearing device 44 and is disposed within a compartment 56 in the piston 48. The piston 48 is spinning due to the additional torque, however the shearing device 44 remains secure. Furthermore, the shearing caused by the additional torque is directed to the frangible point 50, which limits the unpredictability of break points in a system due to additional torque.

In some embodiments, the clevis assembly 25 includes a second pin 52 that extends beyond an outer surface of the clevis assembly 25 and is fastened to the clevis assembly 25 by a fastener 55. A threaded insert 53 is arranged between the structure 43 and the second pin 52. The threaded insert 53 further secures the second pin 52 to the structure 43. The second pin 52 increases the structural integrity of the clevis assembly 25.

The mechanical fuse 39 localizes breaks caused by higher torques to a predetermined area of the at least one shearing device 44. In this sense, the variability of break points is reduced, and breaks caused by higher torques can be more readily managed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A clevis assembly comprising:
   a shackle having two ends, each end respectively comprising an aperture;
   a structure connecting the apertures and housing a bearing;
   a shearing device comprising a frangible point and in operable communication with the bearing; and
   a piston in operable communication with the shearing device and restrained from spinning,
   wherein the shearing device is operable to shear under a pressure greater than a threshold amount and allow the piston to spin.

2. A clevis assembly comprising:
   a shackle having two ends, each end respectively comprising an aperture;
   a structure connecting the apertures and housing a bearing; and
   a shearing device comprising a frangible point and in operable communication with the bearing, wherein the shearing device is housed in a hollow portion of the structure, and further wherein a proximal end of the shearing device extends outward from an aperture of an end of the two shackle ends and a distal end of the shearing device is arranged within an aperture of an outer raceway of the bearing.

3. The clevis assembly of claim 1 further comprising a threaded insert arranged between an inner surface of the structure and an outer surface of the shearing device.

4. The clevis assembly of claim 1, wherein an inner raceway of the bearing is in operable communication with the piston.

5. The clevis assembly of claim 4, wherein the piston is coupled to the bearing for rotation there with comprises a plurality of splines such that coupling the piston with the bearing creates a spline joint.

6. The clevis assembly of claim 1, wherein the shearing device is a cylindrical rod, and wherein the frangible point is a portion of the cylindrical rod having a diameter smaller than another portion of the cylindrical rod.

7. The clevis assembly of claim 1, wherein the frangible point is a portion of the shearing device comprised of a material having a lesser tensile strength than another portion of the shearing device.

8. The clevis assembly of claim 1, wherein the frangible point is a portion of the shearing device having divots along a surface of the portion.

9. The clevis assembly of claim 1, wherein the shearing device is attached to the shackle by a fastener.

10. The clevis assembly of claim 1, wherein the bearing is a journal bearing.

11. A rotary wing aircraft comprising:
a plurality of blade assemblies; and
a tail rotor system having a clevis assembly, wherein the clevis assembly comprises:
a shackle having two ends, each end respectively comprising an aperture;
a structure connecting the apertures and housing a bearing;
a shearing device comprising a frangible point and in operable communication with the bearing; and
a piston in operable communication with the shearing device and restrained from spinning,
wherein the shearing device is operable to shear under a pressure greater than a threshold amount and allow the piston to spin with a tail rotor of the rotary wing aircraft.

12. The rotary wing aircraft of claim 11, wherein an inner raceway of the bearing is in operable communication with the piston.

13. The rotary wing aircraft of claim 12, wherein the piston is in operable communication with a pitch change shaft of the tail rotor system.

14. The rotary wing aircraft of claim 11, wherein the frangible point is configured to break upon application of a pressure greater than a threshold amount.

15. The rotary wing aircraft of claim 14, wherein the pressure is received by the frangible point from an outer raceway of the bearing.

16. The rotary wing aircraft of claim 13 further comprising:
a tail rotor blade mounted to the tail rotor system;
a translating element connected to the tail rotor system via a bearing structure, the bearing structure for supporting the pitch change shaft.

17. The rotary wing aircraft of claim 16 wherein an outer raceway of the bearing structure is coupled to the pitch change shaft, and wherein an inner raceway is coupled to the translating element.

18. The clevis assembly of claim 2 further comprising a piston in operable communication with the shearing device and restrained from spinning, wherein the shearing device is operable to shear under a pressure greater than a threshold amount and allow the piston to spin.

19. The clevis assembly of claim 2, wherein an inner raceway of the bearing is in operable communication with a piston.

20. The clevis assembly of claim 19, wherein the piston is coupled to the bearing for rotation therewith.

* * * * *